(12) United States Patent
Lee

(10) Patent No.: US 8,582,214 B2
(45) Date of Patent: Nov. 12, 2013

(54) LENS MODULE AND CAMERA DEVICE HAVING THE SAME

(75) Inventor: Kyunghwan Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 148 days.

(21) Appl. No.: 13/075,932

(22) Filed: Mar. 30, 2011

(65) Prior Publication Data

US 2011/0242676 A1 Oct. 6, 2011

(30) Foreign Application Priority Data

Apr. 2, 2010 (KR) .......... 10-2010-0030333

(51) Int. Cl.
*G02B 13/18* (2006.01)
*G02B 15/14* (2006.01)

(52) U.S. Cl.
USPC .......................................... 359/715; 359/686

(58) Field of Classification Search
USPC .................. 359/713–715, 683, 686, 773, 766
See application file for complete search history.

(56) References Cited

U.S. PATENT DOCUMENTS

| | | | | |
|---|---|---|---|---|
| 4,832,465 A | * | 5/1989 | Arai et al. | 359/679 |
| 7,342,726 B2 | * | 3/2008 | Kim | 359/666 |
| 8,149,523 B2 | * | 4/2012 | Ozaki | 359/773 |
| 8,184,383 B2 | * | 5/2012 | Shinohara | 359/715 |
| 2008/0180816 A1 | * | 7/2008 | Nakamura | 359/773 |
| 2010/0321793 A1 | * | 12/2010 | Lin | 359/715 |
| 2011/0228409 A1 | * | 9/2011 | Uchida | 359/715 |

* cited by examiner

*Primary Examiner* — Jordan Schwartz
(74) *Attorney, Agent, or Firm* — Saliswanchik, Lloyd & Eisenschenk

(57) ABSTRACT

The present disclosure relates to a lens module, the module including a first lens having a positive (+) refractive power and capable of moving for zooming operation; a second lens having a negative (−) refractive power; a third lens having a positive (+) refractive power and having an inflection point at an image surface; and a fourth lens having a negative (−) refractive power.

10 Claims, 13 Drawing Sheets

LENS MODULE AND CAMERA DEVICE HAVING THE SAME

CROSS-REFERENCE TO RELATED APPLICATION

This application claims the benefit under 35 U.S.C. §119 of the Korean Patent Application No. 10-2010-0030333, filed on Apr. 2, 2010, which is hereby incorporated by reference in its entirety.

BACKGROUND OF THE DISCLOSURE

1. Field of the Invention

The present disclosure relates to a lens module and a camera device having the same 2. Description of Related Art Concomitant with the development of image pick-up systems, researches on terminal camera devices, DSCs (digital still cameras), camcorders and PC cameras (photographing devices attached to a personal computer) have been briskly waged of late. One of the most important constituent parts for a camera related to the image pick-up system to capture an image is a lens module formed with a plurality of lenses.

Particularly, a conventional actuator of a VCM (Voice Coil Motor) driving means used in a small-sized camera unit mounted on a hand-held portable phone for auto-focusing is being changed to MEMS (Micro Electro Mechanical System) actuator.

The VCM actuator-used auto-focusing method is such that a lens barrel reciprocates to perform the auto-focusing while a plurality of lenses is fixed via a lens barrel, that is, the auto-focusing is performed while the lens barrel of the plurality of lenses moves.

However, the MEMS actuator-used auto-focusing method has disadvantages that only one lens nearest to an object is shifted by the MEMS actuator while the other lenses are fixed, such that the lens optical system designed by the VCM actuator cannot be used to a camera device of MEMS actuator method, which necessitates a new power structure using an optical system of high-resolution lens module.

BRIEF SUMMARY

The present disclosure is directed to provide a lens module and a camera having the same configuration to enhance the performance of an image of a camera device using a MEMS actuator by providing a lens module adequate to the camera device that performs an auto-focusing the MEMS actuator.

In one general aspect of the present disclosure, a lens module is provided, comprising, sequentially from an object: a first lens having a positive (+) refractive power and capable of moving for zooming operation; a second lens having a negative (−) refractive power; a third lens having a positive (+) refractive power and having an inflection point at an image surface; and a fourth lens having a negative (−) refractive power.

In some exemplary embodiments of the present disclosure, each of the first through fourth lens is aspherical on an object side surface and an image side surface.

In some exemplary embodiments of the present disclosure, the lens module may satisfy the following conditional expression:

$$0.7 < f1/fz1, f1/fz2, f1/fz3 < 0.9,$$

where fz1 is a total focal length at a first zoom position of the lens module, fz2 is a total focal length at a second zoom position of the lens module, and fz3 is a total focal length at a third zoom position of the lens module In some exemplary embodiments of the present disclosure, the lens module may satisfy the following conditional expression:

$$0.1 < d1 < 0.4, 0.21 < d3 < 0.51,$$

where d1 is a gap between the first lens and the second lens at the first zoom position of the lens module, and d3 is a gap between the first lens and the second lens at the third zoom position of the lens module.

In some exemplary embodiments of the present disclosure, the lens module may satisfy the following conditional expression:

$$5.25 < T < 5.6, 1.2 < T/fz1, T/fz2, T/fz3 < 1.4,$$

where fz1 is a total focal length at a first zoom position of the lens module, fz2 is a total focal length at a second zoom position of the lens module, fz3 is a total focal length at a third zoom position of the lens module, and T is a gap from an object side surface of the first lens to an image forming surface.

In some exemplary embodiments of the present disclosure, the lens module may satisfy the following conditional expression:

$$1.6 < N2 < 1.7, 1.5 < N1, N3, N4 < 1.6,$$

where, respective refractive powers of the first through fourth lens are N1 through N4.

In some exemplary embodiments of the present disclosure, the lens module may satisfy the following conditional expression:

$$22 < V2 < 32, 50 < V1, V3, V4 < 60,$$

where, each Abbe number of the first through fourth lens is V1 through V4.

Meanwhile, an iris in a camera using the lens module is positioned at a direction toward an object side of the first lens.

The present disclosure thus configured is advantageous in that a lens module adequate for a camera device that performs an auto-focusing a MEMS actuator is provided to enhance performance to an image of the camera device using the MEMS actuator.

BRIEF DESCRIPTION OF THE DRAWINGS

The accompanying drawings, which are included to provide a further understanding of the present invention and are incorporated in and constitute a part of this application, and together with the description serve to explain the principle of the invention. In the drawings.

DETAILED DESCRIPTION

Figure 1:
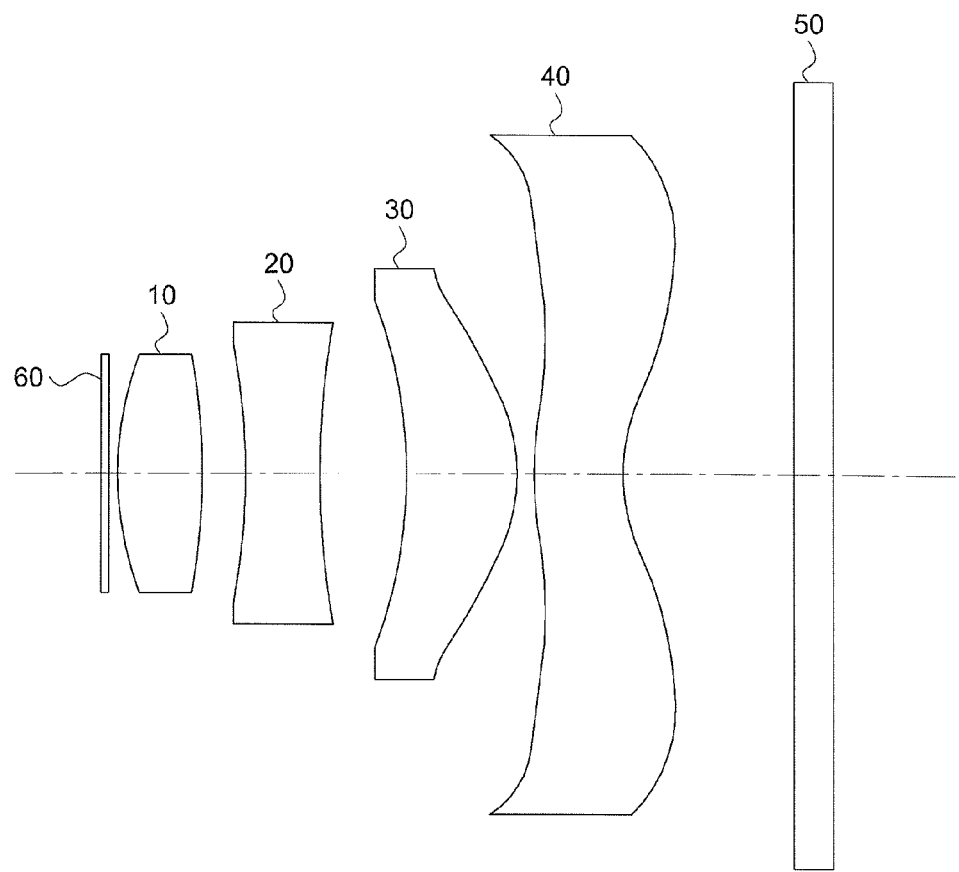
FIG. 1 is a schematic view illustrating a lens module according to an exemplary embodiment of the present invention.

Advantages and features of the present invention and methods of accomplishing the same may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated for the sake of convenience. Furthermore, throughout the descriptions, the same reference numerals will be assigned to the same elements in the explanations of the figures, and explanations that duplicate one another will be omitted.

The terminology used herein is for the purpose of describing particular implementations only and is not intended to be limiting of the invention. As used herein, the singular forms "a", "an" and "the" are intended to include the plural forms as well, unless the context clearly indicates otherwise.

In the description of embodiments, it will be understood that when a layer (or film), region, pattern or structure is referred to as being 'on' or 'under' another layer (or film), region, pad or pattern, the terminology of 'on' and 'under' includes both the meanings of 'directly' and 'indirectly'. Furthermore, the reference about 'on' and 'under' each layer will be made on the basis of drawings. Also, the thickness of each layer in the drawings is an example, and is not limited thereto. Technical features of each embodiment are not limited to that embodiment and may be selectively applied to other embodiments.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features.

Thus, the exemplary term "below" can encompass both an orientation of above and below. The device may be otherwise oriented (rotated 90 degrees or at other orientations) and the spatially relative descriptors used herein interpreted accordingly.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that thickness, size and shape of each lens in FIG. 1 is a bit exaggerated for the sake of convenience, and spherical or aspherical shape is provided as an exemplary embodiment, and the shape is not limited thereto.

Referring to FIG. 1, a lens module according the exemplary embodiment of the present disclosure is sequentially arranged with a first lens (10), a second lens (20), a third lens (30), a fourth lens (40) and a filter (50). An iris (60) may be further arranged at an object side of the first lens (10). The lens module according to the present exemplary embodiment is performed of its auto-focusing by an MEMS actuator (not shown), such that the first lens (10) is mounted on the MEMS actuator and is shifted for auto-focusing.

Light, which is image information of an object, is incident to a light receiving device (not shown) through the first lens (10), the second lens (20), the third lens (30), the fourth lens (40) and the filter (50).

In the hereinafter description of configuration of each lens, an "object side surface" refers to a lens surface facing the object side based on an optical axis, and an "image side surface" refers to a lens surface facing an image capture surface based on an optical axis.

The first lens (10) has a positive (+) refractive power, and an object side surface of the first lens (10) is convex. The object side surface of the first lens (10) may function as an iris, whereby an image capturing lens according to the exemplary embodiment of the present disclosure therefore needs no separate iris. The second lens (20) has a negative (−) refractive power, and an object side surface of the second lens (10) is concave. The third lens (30) has a positive (+) refractive power, the fourth lens (40) has a negative (−) refractive power, and each object side surface/image side surface of the first through fourth lens (10~40) is aspherical.

At this time, the third lens (30) takes an aspheric shape having an inflexion point at the image side surface. As illustrated, the image side surface of the third lens (30) is bent upwards based on the optical axis as it faces from one center to a periphery, and is bent towards the object side to form an aspherical inflexion point as it faces in turn from a periphery distancing from the center to an extreme outside area.

The aspherical inflexion point formed at the third lens (30) may adjust a maximum angle of emergence in key light incident on the light receiving device. Furthermore, the object side surface and the aspherical inflexion point formed at the image side surface of the third lens (30) can adjust the maximum angle of emergence in key light, whereby the shading phenomenon of darkening a periphery of a screen is inhibited.

The filter (50) is at least any one filter of optical filters including an ultra-red filter and a cover glass. In a case the ultra-red filter is used for the filter (50), the ultra-red filter inhibits radiant heat emitted from outside light from being transmitted to the light receiving device (not shown). Furthermore, the ultra-red filter allows the visible light to pass therethrough but reflects the ultra-red light for discharge to the outside.

Each of the first lens (10), the second lens (20), the third lens (30) and the fourth lens (40) advantageously uses the aspherical lens, as in the exemplary embodiments (to follow), to thereby increase the resolution and aberration characteristics.

It should be apparent to those skilled in the art that the following equations and exemplary embodiments are only intended to increase an operational effect, and it is not essential that the present disclosure must be configured to meet all the requirements of the equations and the exemplary embodiments. For example, the lens configuration according to the present disclosure may obtain the operational effect even if some of the following conditional expressions are satisfied.

$0.7 < f1/fz1, f1/fz2, f1/fz3 < 0.9$  Conditional expression 1

$0.1 < d1 < 0.4, 0.21 < d3 < 0.51$  Conditional expression 2

$5.25 < T < 5.6$ $1.2 < T/fz1, T/fz2, T/fz3 < 1.4$  Conditional expression 3

$1.6 < N2 < 1.7$ $1.5 < N1, N3, N4 < 1.6$  Conditional expression 4

$22 < V2 < 32$ $50 < V1, V3, V4 < 60$  Conditional expression 5 where, fz1, fz2, fz3: first, second and third total focal length
f1: focal length of first lens
T: a distance from object side surface of first lens to image capturing surface
d1, d3: a gap between first lens and second lens at first and third zoom position
N1~N4: first to fourth lens refractive index
V1~V4: Abbe number of first to fourth lens The conditional expression 1 defines the refractive power of the first lens (10). The first lens (10) has a refractive power having an adequate compensation of spherical aberration and adequate chromatic aberration according to the conditional expression 1. The conditional expression 3 defines dimensions in the direction of the optical axis in an entire optical system, and provides a condition for a super small-sized lens and a condition for an adequate compensation of aberration.

The conditional expression 4 defines each refractive index of the first lens (10), the second lens (20), the third lens (30) and the fourth lens (40), and the conditional expression 5 defines each Abbe number of the first lens (10), the second lens (20), the third lens (30) and the fourth lens (40). Definition of refractive index and Abbe number for each lens is to provide a condition for better compensating the chromatic aberration.

Hereinafter, the operation effect of the present disclosure will be discussed with reference to exemplary embodiments of the present disclosure.

First Exemplary Embodiment

The following table 1 shows an exemplary embodiment to cater to the above-mentioned conditional expressions.

TABLE 1

| | Exemplary embodiment |
|---|---|
| fz1 (Tele) | 4.3000 |
| fz2 (Middle) | 4.2907 |
| fz3 (Wide) | 4.2450 |
| f1, f2, f3, | 3.36, −6.13, 3.64, −3.99 |
| f1/fz1 | 0.7814 |

TABLE 1-continued

| | Exemplary embodiment |
|---|---|
| f1/fz2 | 0.7831 |
| f1/fz3 | 0.7915 |
| d1 | 0.33 |
| d3 | 0.433 |
| ΣT | 5.55 |
| ΣT/fz1 | 1.2907 |
| ΣT/fz2 | 1.2935 |
| ΣT/fz3 | 1.3074 |
| N1, V1 | 1.53, 56.5 |
| N2 | 1.63 |
| V2 | 26 |
| N3, V3 | 1.53, 56.5 |
| N4 | 1.53 |
| V4 | 56.5 |

Referring to Table 1, it can be noted that all the values corresponding to the conditional expressions 1 through 5 are matched respectively.

The following Table 2 shows a more detailed exemplary embodiment than that of Table 1.

TABLE 2

| Surface number | Radius of curvature (R) | Thickness or distance (d) | Refractive index (N) |
|---|---|---|---|
| 1* | 2.05 | 0.7 | 1.53 |
| 2* | −8.77 | 0.31 | |
| | | 0.3256 | |
| | | 0.404 | |
| 3* | −3.85 | 0.42 | 1.63 |
| 4* | 3143.98 | 0.69 | |
| 5* | −2.53 | 0.7 | 1.53 |
| 6* | −1.16 | 0.20 | |
| 7* | 4.04 | 0.68 | 1.53 |
| 8* | 1.15 | 1.2 | |
| 9 | Infinity | 0.30 | 1.52 |
| 10 | Infinity | 0.1028 | |
| | | 0.1054 | |
| | | 0.1228 | |
| Image | Infinity | −0.0018 | |
| | | −0.0043 | |
| | | −0.0218 | |

The asterisk * shown beside the surface numbers in Tables 2 and 3 refers to aspherical.

The following Table 3 refers to asphericity of each lens in the exemplary embodiment of Table 2.

TABLE 3

| Surf | k | A | B | C | D | E |
|---|---|---|---|---|---|---|
| 1* | — | — | — | — | 0.1 | — |
| 2* | — | — | — | — | 0.0 | — |
| 3* | 6.57 | 0.10 | — | 0.05 | 0.0 | — |
| 4* | 0.00 | 0.11 | — | 0.01 | 0.0 | — |
| 5* | — | — | — | — | 0.0 | 0.000 |
| 6* | — | 0.12 | — | 0.00 | 0.0 | — |
| 7* | — | — | 0.01 | 0.00 | — | 7.424 |
| 8* | — | — | 0.01 | — | 0.0 | — |

Figure 2A:
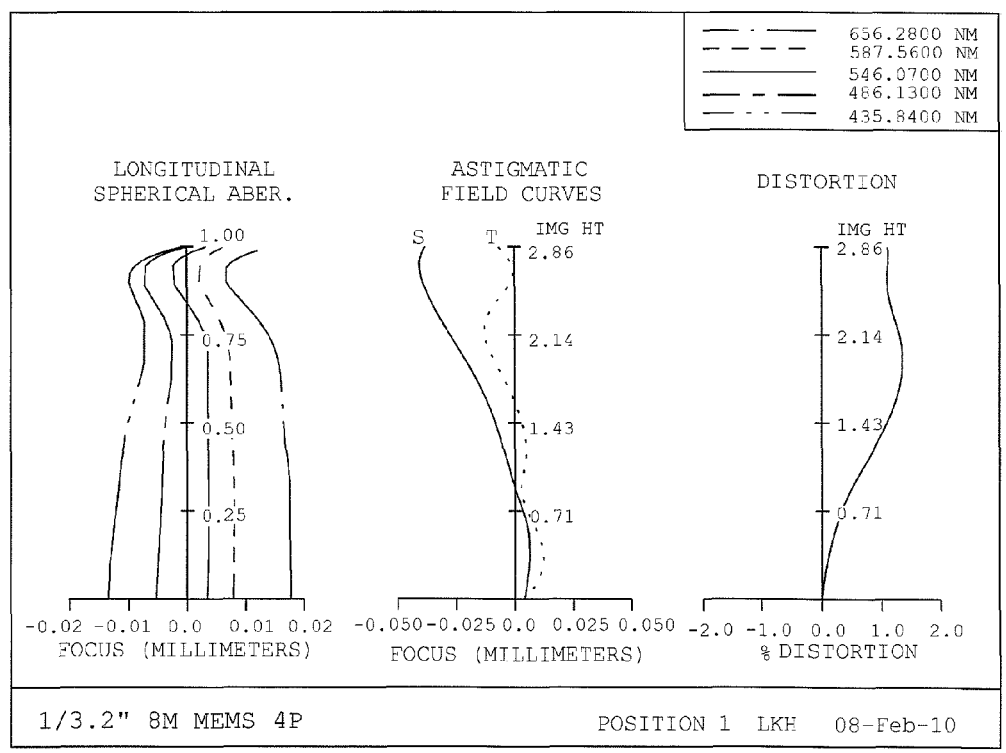
FIGS. 2a, 2b and 2c are graphs illustrating aberration characteristics at first, second and third zoom positions according to a first exemplary embodiment of the present invention.
Figure 2B:
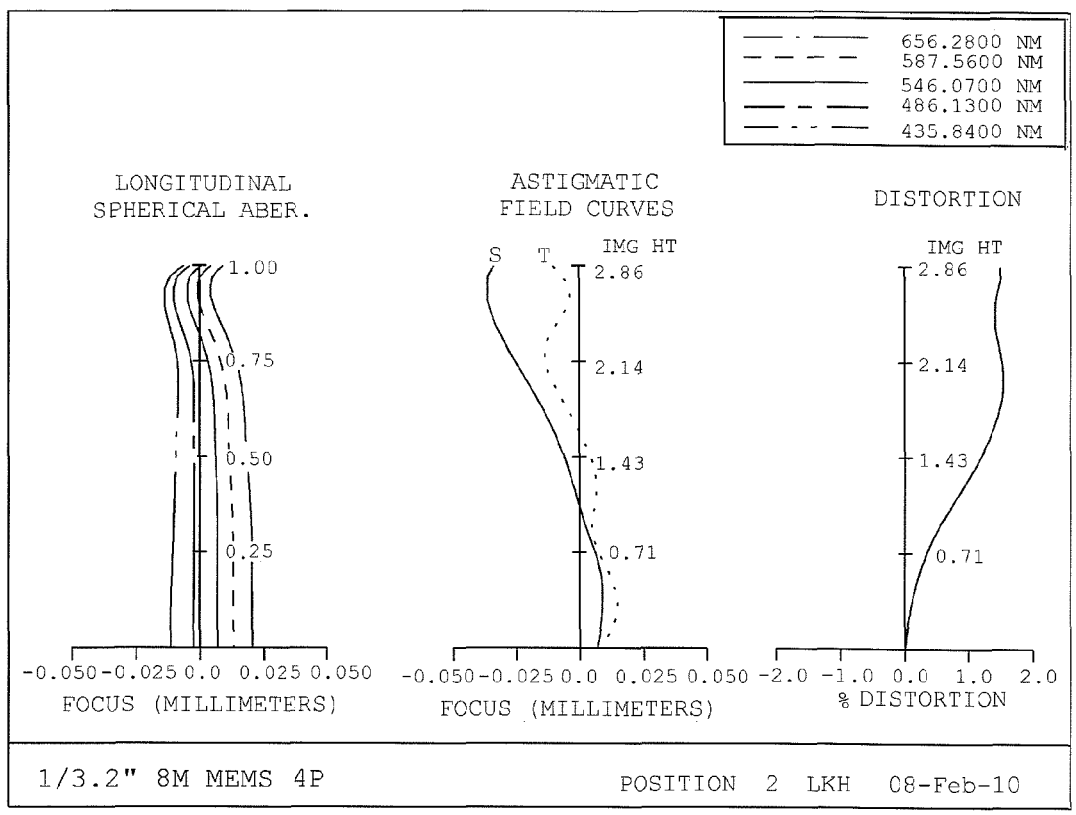
Figure 2C:
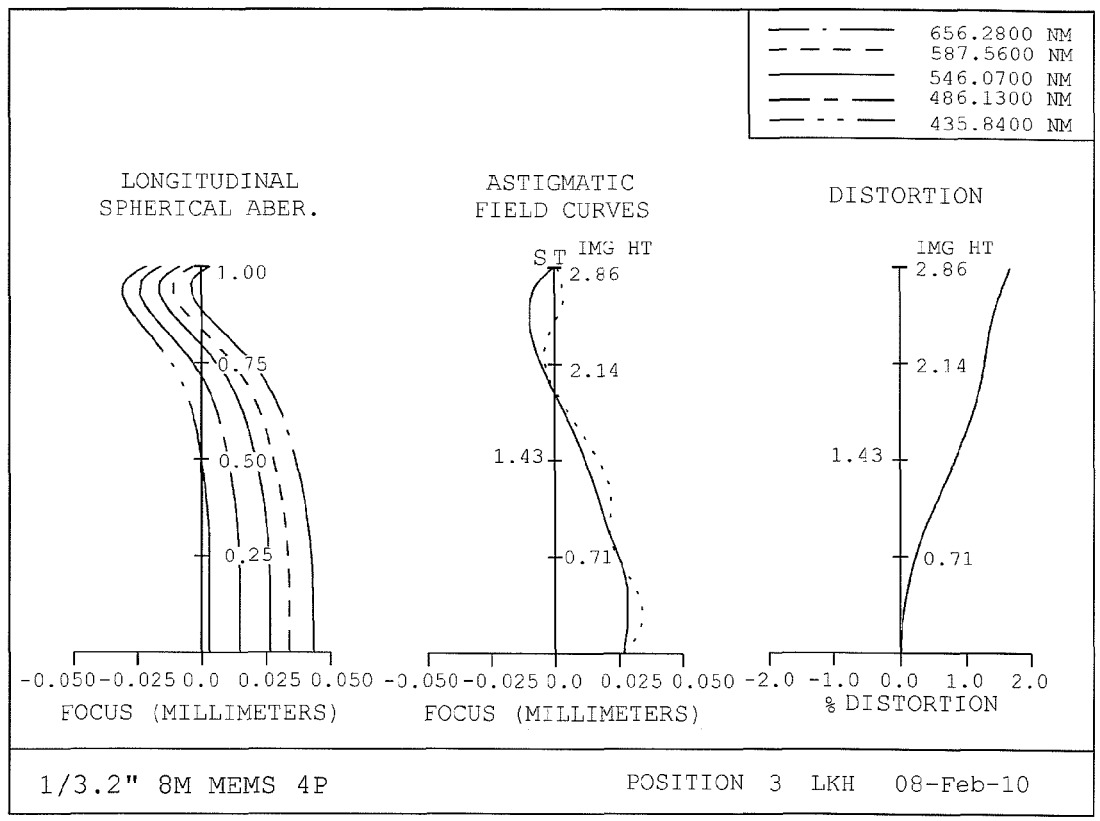

FIGS. 2a, 2b and 2c are graphs illustrating aberration characteristics at first, second and third zoom positions according to the first exemplary embodiment of the present invention, where the left-handed graph shows a longitudinal spherical aberration, the center graph shows an astigmatic field curves, and the right-handed graph shows a distortion, respectively.

The first, second and third zoom positions in the above exemplary embodiment defines positions where the first lens (10) performs the zoom operation while auto-focusing in response to the MEMS actuator (not shown). The first exemplary embodiment describes a total of 3 steps of zooming operations being performed, but it is not limited thereto.

Y axis defines a size of an image while X axis defines a focal length (mm unit) and distortion (% unit) in FIGS. 2a, 2b and 2c.

In FIGS. 2a, 2b and 2c, the curves closer to or approaching the Y axis are interpreted as having a better aberration compensation function. In the illustrated aberration figures, image values are shown to be adjacent to Y axis in most of the fields, which means that all the spherical aberration, the astigmatic field curves, and the distortion represent excellent values.

Figure 3A:
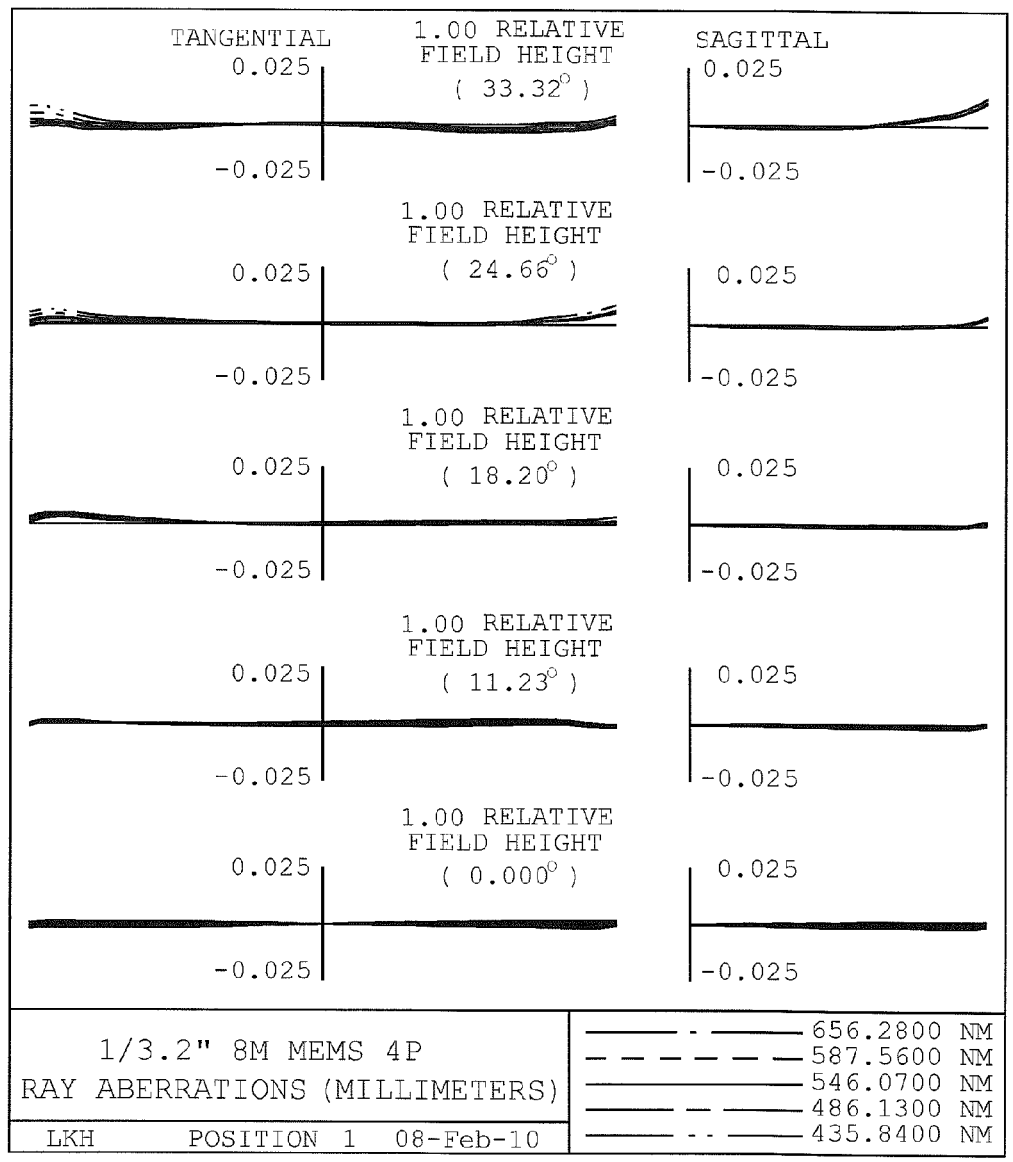
FIGS. 3a, 3b and 3c are graphs illustrating coma aberration characteristics at first, second and third zoom positions according to a first exemplary embodiment of the present invention.
Figure 3B:
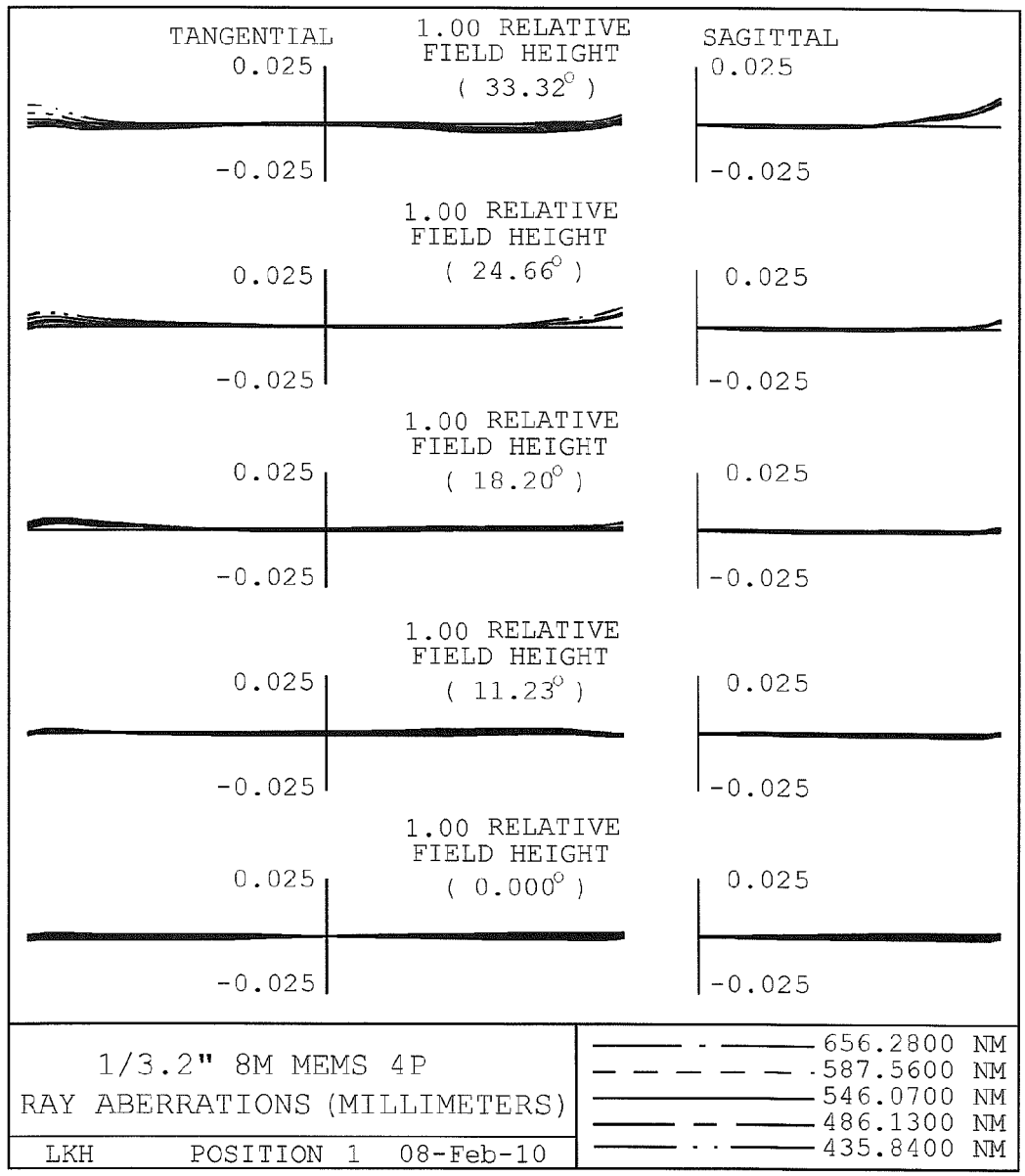
Figure 3C:
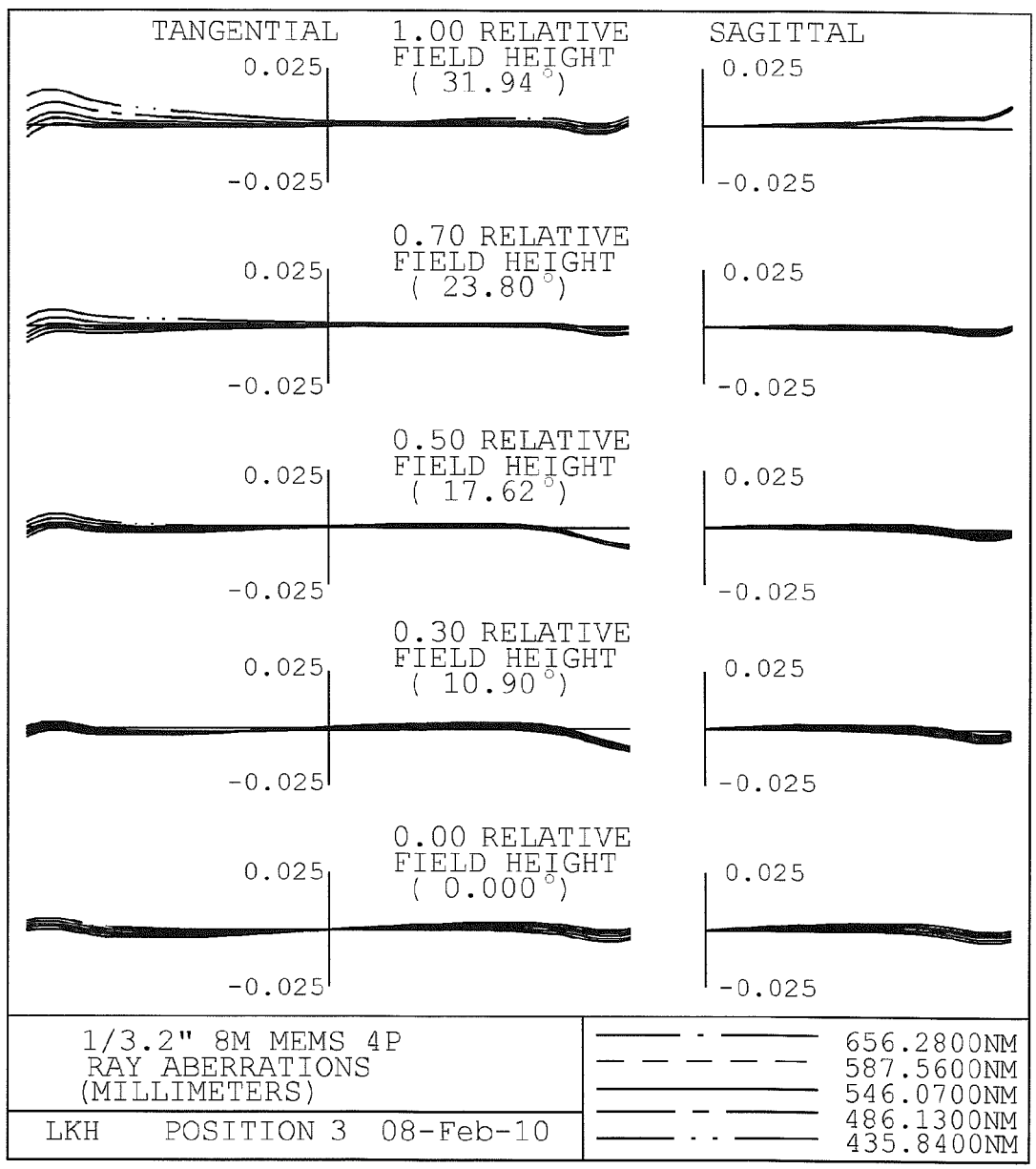

FIGS. 3a, 3b and 3c are graphs illustrating coma aberration characteristics at first, second and third zoom positions according to a first exemplary embodiment of the present invention, where the graphs measure tangential aberration and sagittal aberration of each wavelength based on field height at the upper surface.

The coma aberration compensation function is interpreted as being excellent as image values approach each X axis in the positive axis and the negative axis in the graphs showing the experimental results. The image values in almost every field in the measured examples in FIGS. 3a, 3b and 3c approach X axis, which is interpreted as having excellent coma aberration compensation function.

Second Exemplary Embodiment

The following Table 4 shows a second exemplary embodiment corresponding to the conditional expressions 1 through 5.

TABLE 4

|  | Exemplary embodiment |
|---|---|
| fz1 (Tele) | 4.3200 |
| fz2 (Middle | 4.3066 |
| fz3 (Wide) | 4.2406 |
| f1, f2, f3, | 3.19, −6.03, 3.41, −3.28 |
| f1/fz1 | 0.7384 |
| f1/fz2 | 0.7407 |
| f1/fz3 | 0.7523 |
| d1 | 0.31 |
| d3 | 0.404 |
| ΣT | 5.30 |
| ΣT/fz1 | 1.2269 |
| ΣT/fz2 | 1.2307 |
| ΣT/fz3 | 1.2498 |
| N1, V1 | 1.53, 56.5 |
| N2 | 1.63 |
| V2 | 26 |
| N3, V3 | 1.53, 56.5 |
| N4 | 1.53 |
| V4 | 56.5 |

Referring to the above Table 4, it can be noted that values corresponding to the conditional expressions 1 through 5 in the second exemplary embodiment are also matched respectively.

The following Table 5 shows a more detailed exemplary embodiment than that of Table 4.

TABLE 5

| Surface number | Radius of curvature (R) | Thickness or distance (d) | Refractive index (N) |
|---|---|---|---|
| 1* | 2.05 | 0.7 | 1.53 |
| 2* | −8.77 | 0.31 | |
| | | 0.3256 | |
| | | 0.404 | |
| 3* | −3.85 | 0.42 | 1.63 |
| 4* | 3143.98 | 0.69 | |
| 5* | −2.53 | 0.7 | 1.53 |

TABLE 5-continued

| Surface number | Radius of curvature (R) | Thickness or distance (d) | Refractive index (N) |
|---|---|---|---|
| 6* | −1.16 | 0.20 | |
| 7* | 4.04 | 0.68 | 1.53 |
| 8* | 1.15 | 1.2 | |
| 9 | Infinity | 0.30 | 1.52 |
| 10 | Infinity | 0.1028 | |
| | | 0.1054 | |
| | | 0.1228 | |
| Image | Infinity | −0.0018 | |
| | | −0.0043 | |
| | | −0.0218 | |

The asterisk * shown beside the surface numbers in Table 5 and the following Table 6 refers to aspherical.

The following Table 6 refers to asphericity of each lens in the exemplary embodiment of Table 5.

TABLE 6

| Surf | k | A | B | C | D | E |
|---|---|---|---|---|---|---|
| 1* | — | — | — | — | 0.1 | — |
| 2* | — | — | — | — | 0.0 | — |
| 3* | 6.57 | 0.10 | — | 0.05 | 0.0 | — |
| 4* | 0.00 | 0.11 | — | 0.01 | 0.0 | — |
| 5* | — | — | — | — | 0.0 | 0.000 |
| 6* | — | 0.12 | — | 0.00 | 0.0 | — |
| 7* | — | — | 0.01 | 0.00 | — | 7.424 |
| 8* | — | — | 0.01 | — | 0.0 | — |

Figure 4A:
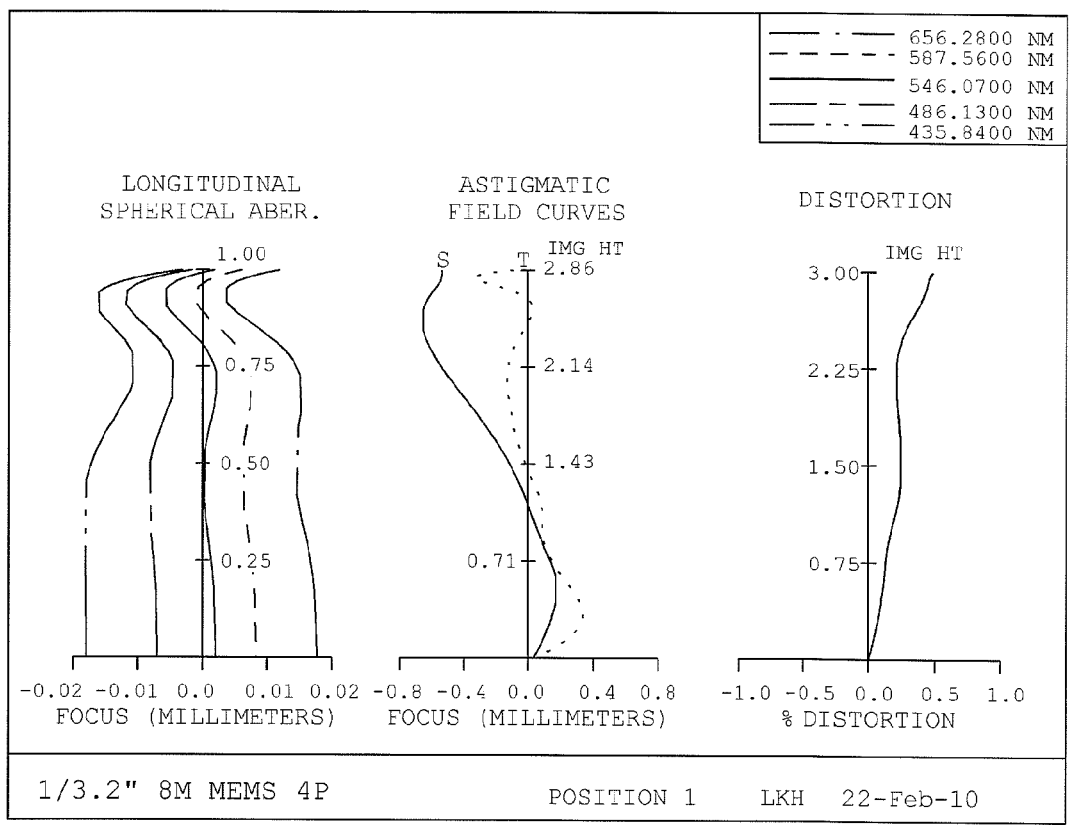
FIGS. 4a, 4b and 4c are graphs illustrating aberration characteristics at first, second and third zoom positions according to a second exemplary embodiment of the present invention.
Figure 4B:
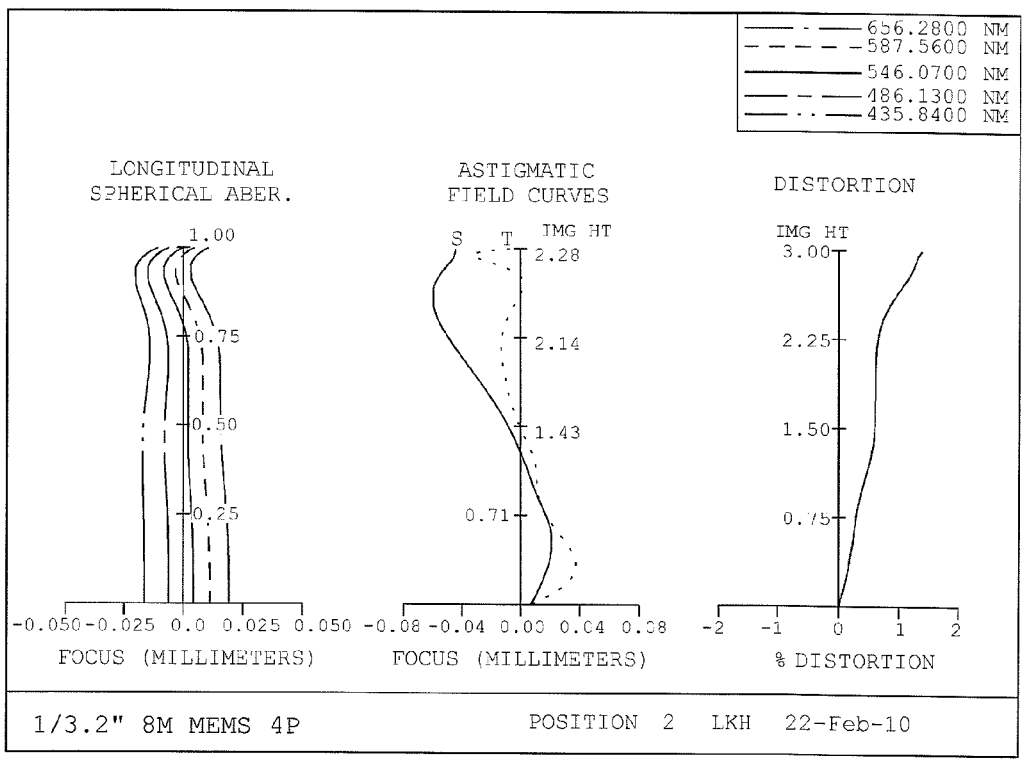
Figure 4C:
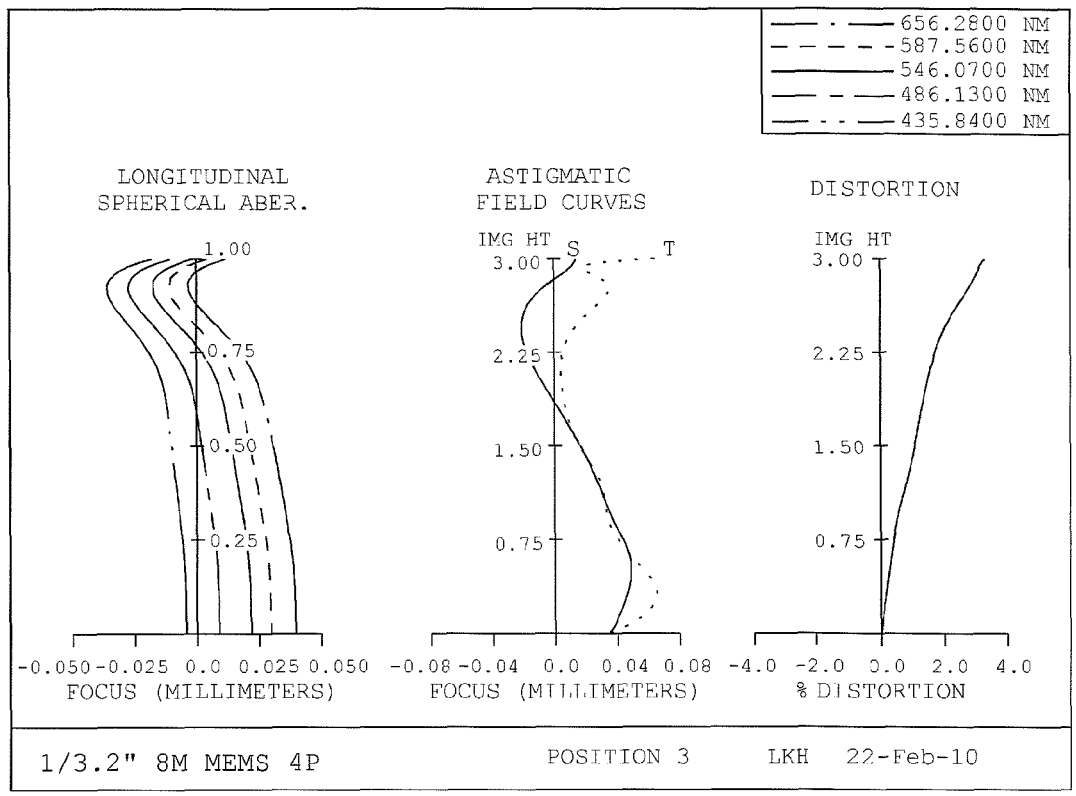

FIGS. 4a, 4b and 4c are graphs illustrating aberration characteristics at first, second and third zoom positions according to a second exemplary embodiment of the present invention, as in the first exemplary embodiment, where the left-handed graph shows a longitudinal spherical aberration, the center graph shows an astigmatic field curves, and the right-handed graph shows a distortion, respectively.

Likewise, in the second exemplary embodiment, the curves closer to or approaching the Y axis are interpreted as having a better aberration compensation function. In the illustrated aberration figures, image values are shown to be adjacent to Y axis in most of the fields, which means that all the spherical aberration, the astigmatic field curves, and the distortion represent excellent values.

Figure 5A:
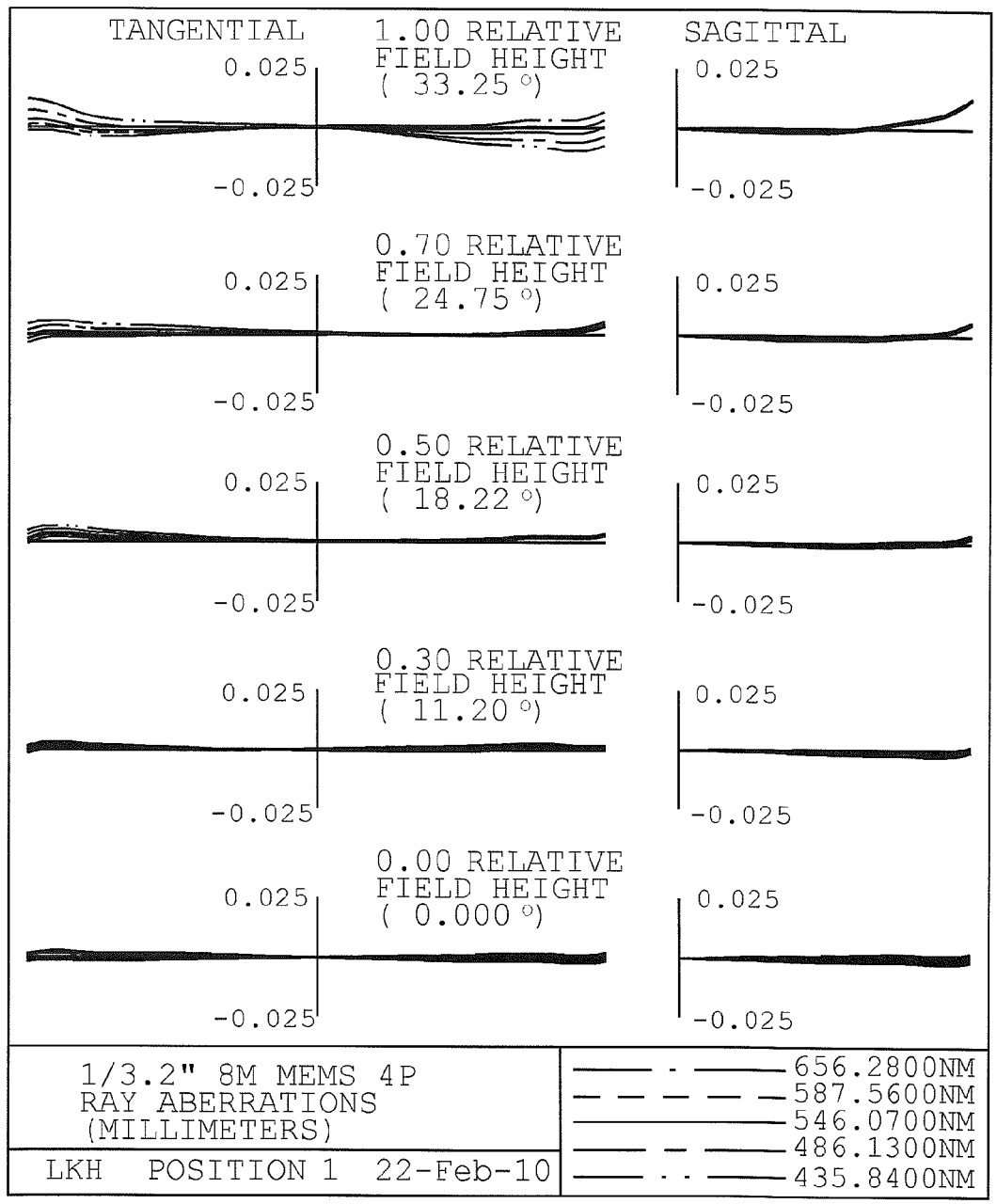
FIGS. 5a, 5b and 5c are graphs illustrating coma aberration characteristics at first, second and third zoom positions according to a second exemplary embodiment of the present invention.
Figure 5B:
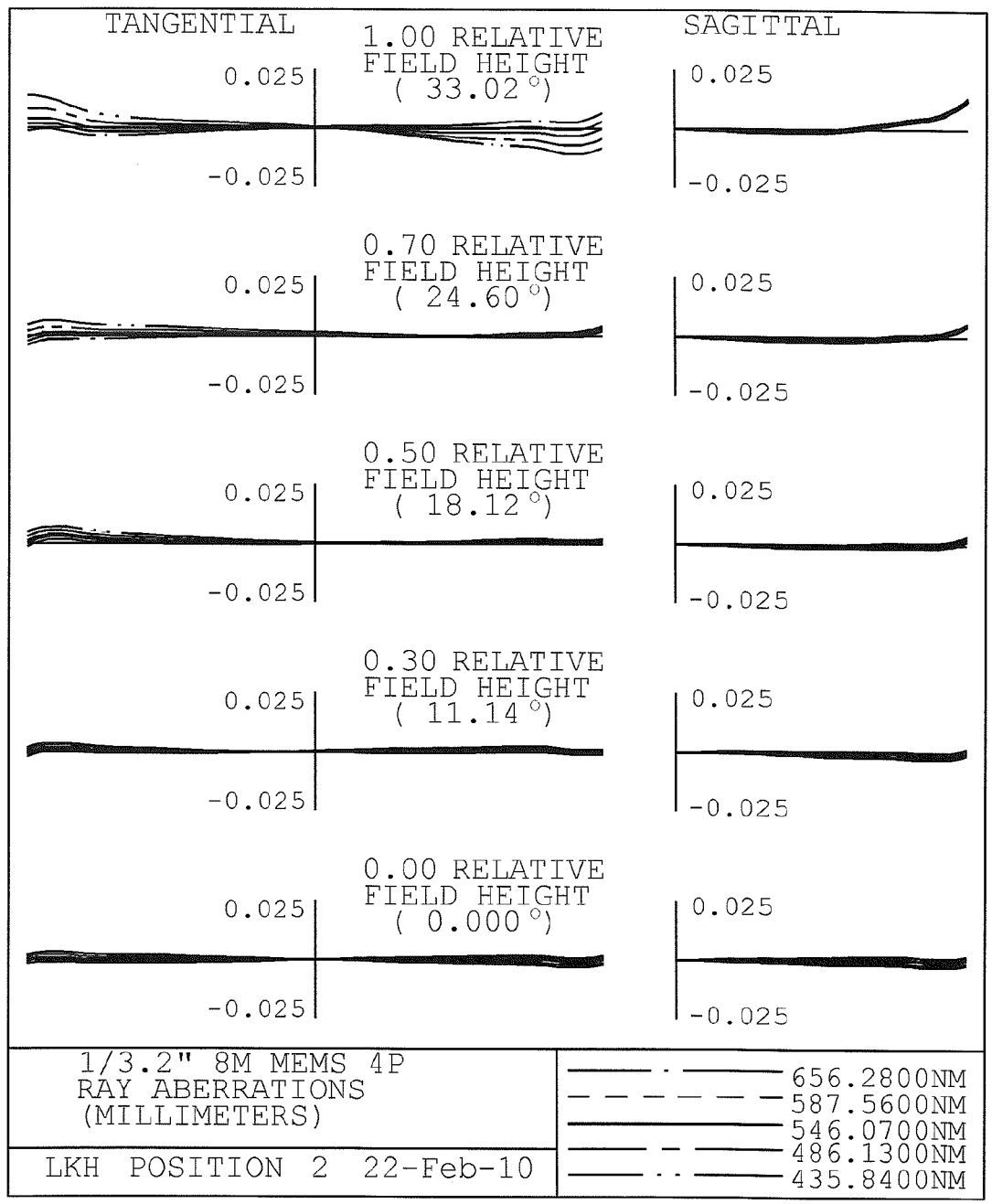
Figure 5C:
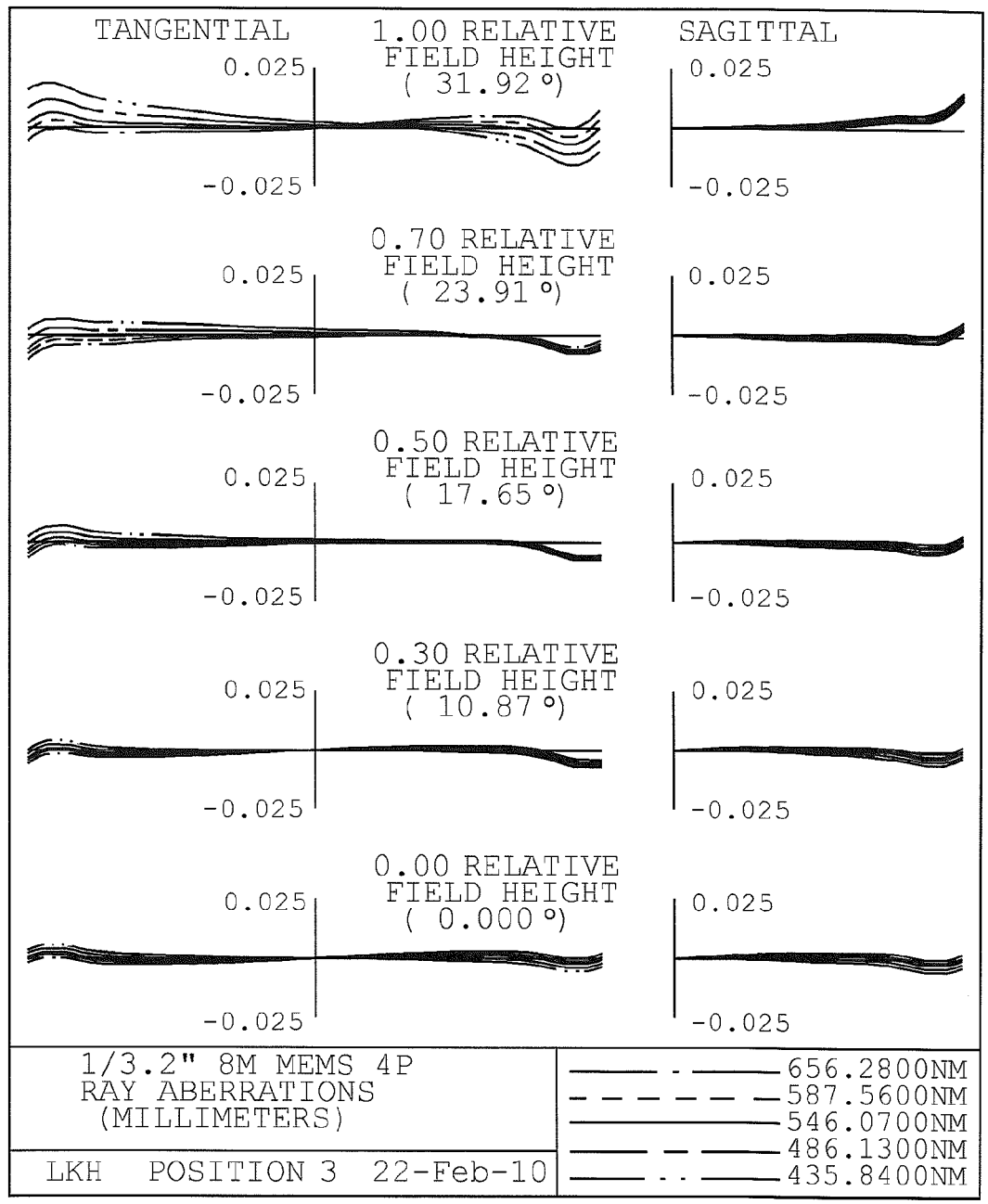

FIGS. 5a, 5b and 5c are graphs illustrating coma aberration characteristics at first, second and third zoom positions according to a second exemplary embodiment of the present invention, Closer approach to X axis in the positive axis and the negative axis defines that coma aberration compensation function is interpreted as having an excellence. As illustrated in the measured values of FIGS. 5a, 5b and 5c, the image values in almost every field are closer to the X axis, which is interpreted as all having excellent coma aberration compensation function.

The lens module according to the present disclosure through description of first and second exemplary embodiments can be applied to camera devices that use MEMS actuator as means for performing the zoom operation while auto-focusing. It should be also apparent that a separate iris may be further mounted towards the direction of object side of the first lens (10).

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents

What is claimed is:

1. A lens module, comprising, sequentially from an object with no intervening lenses: a first lens having a positive (+) refractive power; a second lens having a negative (−) refractive power; a third lens having a positive (+) refractive power and having an inflection point at an image surface; and a fourth lens having a negative (−) refractive power;
   wherein the lens module comprises at least three different zoom positions depending on movement of the first lens, and
   wherein the lens module satisfies the following conditional expression:

$0.7<f1/fz1, f1/fz2, f1/fz3<0.9,$ wherein fz1 is a total focal length at a Tele position of the lens module, fz2 is a total focal length at a Middle position of the lens module, and fz3 is a total focal length at a Wide position of the lens module, wherein f1 is a focal length of the first lens.

2. The module of claim 1, wherein each of the first through fourth lens is aspherical on an object side surface and an image side surface.

3. A lens module, comprising, sequentially from an object with no intervening lenses: a first lens having a positive (+) refractive power; a second lens having a negative (−) refractive power; a third lens having a positive (+) refractive power and having an inflection point at an image surface; and a fourth lens having a negative (−) refractive power; wherein the lens module comprises at least three different zoom positions depending on movement of the first lens and wherein the lens module satisfies the following conditional expression:

$0.2<d1<0.4, 0.21<d3<0.51,$ wherein d1 is a gap between the first lens and the second lens at a Tele position of the lens module, and d3 is a gap between the first lens and the second lens at a Wide position of the lens module.

4. A lens module, comprising, sequentially from an object with no intervening lenses: a first lens having a positive (+) refractive power; a second lens having a negative (−) refractive power; a third lens having a positive (+) refractive power and having an inflection point at an image surface; and a fourth lens having a negative (−) refractive power; wherein the lens module comprises at least three different zoom positions depending on movement of the first lens, wherein the lens module forms an image and has an image forming surface, and wherein the lens module satisfies the following conditional expression:

$5.25<T<5.6,$ $1.2<T/fz1, T/fz2, T/fz3<1.4,$ wherein fz1 is a total focal length at a Tele position of the lens module, fz2 is a total focal length at a Middle position of the lens module, fz3 is a total focal length at a Wide position of the lens module, and T is a gap from an object side surface of the first lens to the image forming surface.

5. The module of claim 1, wherein the lens module satisfies the following conditional expression:

$1.6<N2<1.7,$ $1.5<N1, N3, N4<1.6,$ wherein respective refractive powers of the first through fourth lens are N1 through N4, respectively.

6. The module of claim 1, wherein the lens module satisfies the following conditional expression:

$22<V2<32,$ $50<V1, V3, V4<60,$ wherein each Abbe number of the first through fourth lens is V1 through V4, respectively.

7. A camera apparatus comprising the lens module of any one claim of 1 through 6, wherein an iris in a camera using the lens module is positioned at an object side of the first lens.

8. A lens module, comprising, in order from an object side: a first lens having a positive (+) refractive power; a second lens having a negative (−) refractive power; a third lens having a positive (+) refractive power and having an inflection point at an image surface; and a fourth lens having a negative (−) refractive power; wherein the lens module comprises different total focal lengths depending on positions of the first lens and wherein the lens module satisfies the following conditional expression:

$0.7<f1/fz1, f1/fz3<0.9,$ wherein fz1 is a total focal length at a Tele position of the lens module, and fz3 is a total focal length at a Wide position of the lens module, wherein f1 is a focal length of the first lens, and
   wherein each of the first through fourth lens is aspherical on an object side surface and an image side surface.

9. A lens module, comprising, in order from an object side: a first lens having a positive (+) refractive power and capable of moving for an autofocusing operation; a second lens having a negative (−) refractive power; a third lens having a positive (+) refractive power and having an inflection point at an image surface; and a fourth lens having a negative (−) refractive power; wherein the lens module comprises different total focal lengths depending on positions of the first lens, wherein the lens module forms an image and has an image forming surface, and wherein the lens module satisfies the following conditional expression:

$1.2<T/fz1, T/fz3<1.4,$ wherein fz1 is a total focal length at a Tele position of the lens module, fz3 is a total focal length at a Wide position of the lens module, and T is a gap from an object side surface of the first lens to the image forming surface.

10. A camera apparatus comprising the lens module of claim 9, wherein an iris in a camera using the lens module is positioned at an object side of the first lens.

* * * * *